(12) United States Patent
Wheeler et al.

(10) Patent No.: US 11,215,397 B2
(45) Date of Patent: Jan. 4, 2022

(54) VIBRATION UNIT ASSEMBLY FOR A BELT CONVEYOR

(71) Applicant: The University of Newcastle, Callaghan (AU)

(72) Inventors: Craig Anthony Wheeler, Callaghan (AU); Jens Plinke, Tighes Hill (AU); Kenneth Charles Williams, Seaham (AU); Peter William Alexander Robinson, Maryland (AU); Kevin James Barber, Bolwarra Heights (AU); Oliver James Whatnall, Highfields (AU); John James Warner, Gnarabup (AU)

(73) Assignee: The University of Newcastle, Callaghan (AU)

( * ) Notice: Subject to any disclaimer, the term of this patent is extended or adjusted under 35 U.S.C. 154(b) by 92 days.

(21) Appl. No.: 16/631,745

(22) PCT Filed: Jul. 17, 2018

(86) PCT No.: PCT/AU2018/050747
§ 371 (c)(1),
(2) Date: Jan. 16, 2020

(87) PCT Pub. No.: WO2019/014713
PCT Pub. Date: Jan. 24, 2019

(65) Prior Publication Data
US 2020/0166274 A1    May 28, 2020

(30) Foreign Application Priority Data

Jul. 17, 2017 (AU) ................................ 2017902806

(51) Int. Cl.
*F26B 5/14* (2006.01)
*B01D 33/048* (2006.01)
(Continued)

(52) U.S. Cl.
CPC .............. *F26B 5/14* (2013.01); *B01D 33/048* (2013.01); *B01D 33/644* (2013.01);
(Continued)

(58) Field of Classification Search
CPC . F26B 5/14; F26B 5/12; F26B 17/023; B01D 33/048; B01D 33/644;
(Continued)

(56) References Cited

U.S. PATENT DOCUMENTS 4,289,622 A * 9/1981 Schotten ............... B01D 25/127
210/225
4,799,501 A * 1/1989 Liebe ....................... A24B 3/02
131/299
(Continued)

FOREIGN PATENT DOCUMENTS

CN      204395598 U    6/2015
EP        0021362 A1    1/1981
(Continued)

OTHER PUBLICATIONS

International Search Report for International Patent Application No. PCT/AU2018/050747, dated Oct. 17, 2018 (7 pages).
(Continued)

Primary Examiner — John P McCormack
(74) Attorney, Agent, or Firm — Nixon Peabody LLP (57) ABSTRACT

A vibration unit assembly for a belt conveyor has a vibration element, and vibration generator and a connection assembly. The vibration generator is operatively connected to the vibration element for inducing vibrations in the vibration element. The connection assembly connects the vibration element to the belt conveyor so that the vibration element may move relative to the belt conveyor. A contact surface of the vibration element engages a material to vibrate and compress the material as it is transported on the belt con-
(Continued)

veyor. The vibration element may include a plate or a roller. A method for treating a material involves applying a vibration force and applying a compressive force to compact the material. A method for drying a material involves applying a vibration force to the material to release fluid and applying a compressive force to compact the material.

21 Claims, 7 Drawing Sheets

(51) Int. Cl.
  *B01D 33/64* (2006.01)
  *F26B 5/12* (2006.01)
  *F26B 17/02* (2006.01)
  *B01D 33/052* (2006.01)

(52) U.S. Cl.
  CPC .............. *B01D 33/646* (2013.01); *F26B 5/12* (2013.01); *F26B 17/023* (2013.01); *B01D 33/052* (2021.08)

(58) Field of Classification Search
  CPC ...... B01D 33/646; B01D 33/64; B01D 33/62; B01D 2033/052; B65G 27/16; B65G 27/32; B65G 47/1421; B65G 69/0425; B65G 2812/03
  USPC ....... 34/398; 198/752.1, 758, 766, 521, 533, 198/609
  See application file for complete search history.

(56) References Cited

U.S. PATENT DOCUMENTS

| | | | |
|---|---|---|---|
| 5,133,883 A * | 7/1992 | Prinssen | B01D 33/04 210/783 |
| 5,331,746 A * | 7/1994 | Martin | F16C 33/6685 34/164 |
| 7,980,484 B1 * | 7/2011 | Podoll | E01C 19/203 239/4 |
| 9,587,192 B2 | 3/2017 | Swensen | |
| 2002/0109254 A1 * | 8/2002 | Huber | B27N 3/14 264/126 |
| 2005/0167247 A1 | 8/2005 | Chojnacki | |
| 2012/0030998 A1 | 2/2012 | Barkdoll | |

FOREIGN PATENT DOCUMENTS

| | | |
|---|---|---|
| GB | 2048845 A | 12/1980 |
| JP | 11090388 A * | 4/1999 |
| WO | WO 2010/051734 A1 | 5/2009 |

OTHER PUBLICATIONS

Written Opinion of International Searching Authority for International Patent Application No. PCT/AU2018/050747, dated Oct. 17, 2018 (6 pages).

* cited by examiner

VIBRATION UNIT ASSEMBLY FOR A BELT CONVEYOR

CROSS-REFERENCE TO RELATED APPLICATIONS

This application is a U.S. National Stage of International Application No. PCT/AU2018/050747, filed Jul. 17, 2018, which claims the benefit of Australian Patent Application No. 2017902806, filed Jul. 17, 2017, both which are incorporated herein by reference in their entireties.

FIELD OF THE INVENTION

The invention relates to a vibration unit assembly for a belt conveyor and in a particular to a vibration unit assembly for a horizontal vacuum bed filter. The invention has been developed primarily for use as a dewatering unit in a horizontal vacuum bed filter and will be described hereinafter by reference to this application. However, it will be appreciated that the invention is not limited to this application and may be more generally applied to the treatment of materials on a belt conveyor, including dewatering processes.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Vacuum belt filters are used to dewater materials (i.e. separate liquids from solids in the material) so that the dry material is has a reduced volume to reduce storage and transport costs. The dry material is usually transported by rail or boat, or stored as a waste by-product in a tailings dump or dry stack. The dewatering of materials is typically governed by the Transportable Moisture Limit (TML) of a material. This is the maximum allowable moisture content a material can have, to be loaded on a ship. If the moisture exceeds this TML value, the material is at risk of liquefaction, which could potentially capsize a vessel.

In addition, the vacuum belt filter avoids the risk of liquefaction of the material, minimises the amount of fluid or any runoff of fluid when the material is disposed in landfill or a tailings dump and enhances the drying process. The size of the belt filter machine varies, depending on the desired throughput, moisture content and mineralogy of the material. Common materials which utilise vacuum belt filters include bulk materials such as iron ore, coal, manganese and other minerals; grain; flour; waste and chemical slurries; and pulp.

One type of vacuum belt filter is a horizontal vacuum belt filter (HVBF) that uses a horizontal belt conveyor comprising an endless belt upon which is disposed a filter cloth. The filter cloth is usually composed of a semi permeable material designed to allow liquid to pass through, while retaining the solid. The material slurry is fed onto this filter cloth and is transported along the belt conveyor. A vacuum system is connected to the underside of the endless belt to apply a vacuum suction force to draw out liquid from the material (often called "filter cake") to leave behind a dry solid.

Finer materials present challenges when dewatered using this method, as the voids within the filter cake tend collapse on themselves under the application of vacuum, trapping the water inside, and limiting airflow. Consequently, this problem limits the application of HVBFs typically to materials with particle sizes greater than 100 microns. Due to this limitation, fine materials are typically dewatered using a filter press arrangement which forces high pressure air through a slurry of the material to remove the liquid from the material. In comparison to a HVBF, these filter press machines have high installation, operation and maintenance costs. In addition, the filter press machine is limited to being operated as a batch process, compared to a continuous process that occurs in a HVBF.

It is an object of the present invention to overcome or substantially ameliorate one or more of the disadvantages of prior art, or at least to provide a useful alternative. It is an object of the invention in at least one embodiment to provide a vibration unit assembly for a HVBF that enables it to process finer particles below 100 microns.

SUMMARY OF THE INVENTION

A first aspect of the invention provides a vibration unit assembly for a belt conveyor, comprising:
 a vibration element having a contact surface;
 a vibration generator operatively connected to the vibration element for inducing vibrations in the vibration element; and
 a connection assembly for connecting the vibration element to the belt conveyor so that the vibration element may move relative to the belt conveyor;
 wherein the contact surface is engagable with a material transported on the belt conveyor to vibrate and compress the material.

In one embodiment, the vibration element comprises a plate and the contact surface comprises an underside surface of the plate. In some embodiments, a portion of the plate comprises perforations. In other embodiments, the plate comprises perforations.

In another embodiment, the vibration element comprises a roller and the contact surface comprises an outer surface of the roller. In some embodiments, the roller is mounted to a frame connected to the connection assembly. The roller may be cylindrical in shape. Preferably, the roller has a length of up to 6 m. Preferably, the roller has a diameter of up to 1 m.

In a further embodiment, the vibration element comprises a ball and the contact surface comprises an outer surface of the ball. In some embodiments, the ball is mounted to a frame connected to the connection assembly. In some embodiments, there is a plurality of balls. The ball may be spherical, ovoid or oblong in shape.

In some embodiments, the contact surface comprises one or more protrusions for engaging the material. The protrusions may be nodules, teeth, saw-tooth like projections and the like. The protrusions may also be partly spherical, rectangular, triangular or any other polyhedral shape.

In some embodiments, the vibration element comprises one or more weights for increasing the compression force on the material. In one embodiment, the vibration element comprises a holder for holding the one or more weights. In another embodiment, the holder comprises a stand for retaining the one or more weights. Where the vibration element comprises a plate, the holder comprises a pin or spike to holding the one or more weights. Where the vibration element comprises a roller or ball, the holder is located on a mounting frame.

In some embodiments, the vibration unit assembly comprises a plurality of vibration elements. In one embodiment, the vibration elements are operatively connected to the same vibration generator. In another embodiment, the vibration elements are operatively connected in groups to different vibration generators. In a further embodiment, there is a plurality of vibration generators and each vibration element is each operatively to a different vibration generator.

In some embodiments, the vibration generator comprises a pneumatic vibrator. In one embodiment, the pneumatic vibrator operates at 4,000 to 6,000 vibrations per minute. In another embodiment, the pneumatic vibrator operates at 500 to 50,000 revolutions per minute. In a further embodiment, the pneumatic vibrator operates from 1 Hz to 1 kHz. In yet another embodiment, the pneumatic vibrator operates at a driving pressure of up to 100 psi. In a still further embodiment, the pneumatic vibrator operates at a driving pressure of between 40 to 100 psi.

In some embodiments, the vibration generator comprises a rotating electrical vibrator. In one embodiment, the rotating electrical vibrator operates at 500 to 50,000 revolutions per minute. In another embodiment, the rotating electrical vibrator operates at a driving pressure of up to 100 psi.

In some embodiments, the vibration generator comprises a linear electric vibrator. In one embodiment, the linear electric vibrator operates from 1 Hz to 1 kHz.

In some embodiments, the connection assembly comprises one or more connecting arms for pivotably connecting the vibration element to the belt conveyor. In other embodiments, the one or more connecting arms are pivotably connectable to a frame or one or more sides of the belt conveyor.

In some embodiments, the vibration unity assembly further comprises a positioning assembly to adjust the position of the vibration element relative to the belt conveyor. In one embodiment, the positioning assembly is able to adjust the position of the vibration element at an angle relative to a planar surface of the belt conveyor. In another embodiment, the angle varies from 0° to 90°, and preferably 1° to 45°, from a first axis of the vibration element. In a further embodiment, the first axis is perpendicular to the length of the conveyor.

In some embodiments, the positioning assembly comprises a guide sleeve for guiding the vibration element into position. In other embodiments, the guide sleeve is slidably mounted to the mounting frame and is pivotably connected to the vibration element.

In some embodiments, the positioning assembly forms part of the connection assembly.

In other embodiments, the connection assembly comprises a frame for pivotably connecting the vibration element to the belt conveyor.

A second aspect of the invention provides a belt conveyor, comprising an endless belt for transporting a material and the vibration unit assembly of the first aspect of the invention.

In some embodiments, the belt conveyor comprises a filter cloth for supporting a material on the endless belt and permitting fluid to pass through.

In some embodiments, the endless belt comprises channels for directing air flow.

In some embodiments, the belt conveyor comprises a vacuum chamber disposed beneath the endless belt and a vacuum pump operatively connected to the vacuum chamber to provide a vacuum suction force to the chamber and the endless belt.

In some embodiments, the belt conveyor is configured as a horizontal vacuum bed filter.

The second aspect may have the preferred features of the first aspect of the invention stated above, where applicable.

A third aspect of the invention provides a method for treating a material, comprising the steps of:
moving the material along a belt conveyor;
applying a vibration force to the material; and
applying a compressive force to compact the material.

In one embodiment, the vibration force applying step and the compressive force applying step are performed simultaneously.

In some embodiments, the vibration force applying step comprises mechanical vibrating the material.

In some embodiments, the vibration force applying step comprises applying a linear vibratory motion to the material. In other embodiments, the vibration force applying step comprises applying oscillatory vibratory motion to the material.

In some embodiments, the compressive force applying step comprises applying one or more weights to the material.

The third aspect may have the preferred features of the first and second aspects of the invention stated above, where applicable.

A fourth aspect of the invention provides a method for drying a material comprising a mixture of solid and fluid, the method comprising the steps of:
moving the material along a belt conveyor;
applying a vibration force to rupture the material to release fluid;
removing the released fluid from the material; and
applying a compressive force to compact the material.

In some embodiments, the compressive force applying step further releases fluid from the material.

In some embodiments, the method further comprises filtering the material as it moves along the belt conveyor to remove excess fluid from the material.

In some embodiments, the removing step comprises applying a suction force to the material to remove the fluid.

The fourth aspect may have the preferred features of the first, second and third aspects of the invention stated above, where applicable.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

The present invention will now be described with reference to the following examples which should be considered in all respects as illustrative and non-restrictive. In particular, the embodiments of the invention are described in the context of its particular application as a dewatering unit in a horizontal vacuum bed filter used to dewater mineral particulate material, such as silica, mining tailings, mineral ores and the like. However, it will be appreciated that the invention is not limited to this application and may be more generally applied to the treated of any material requiring vibration and compression, such as dewatering processes. In the Figures, corresponding features within the same embodiment or common to different embodiments have been given the same reference numerals.

Figure 1:
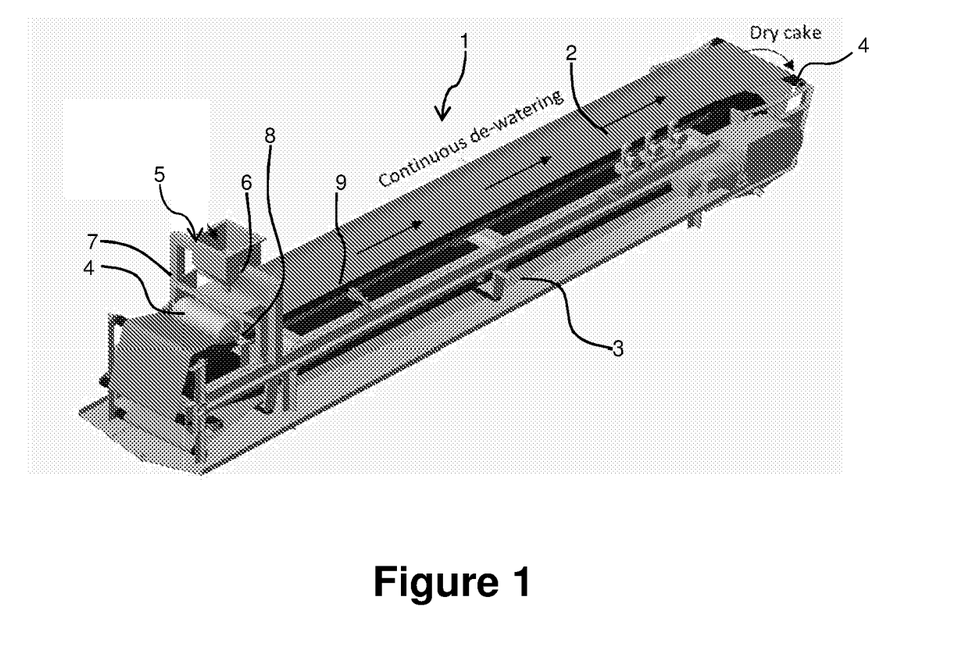
FIG. 1 is a perspective view of a horizontal vacuum bed filter (HVBF)
Figure 2:
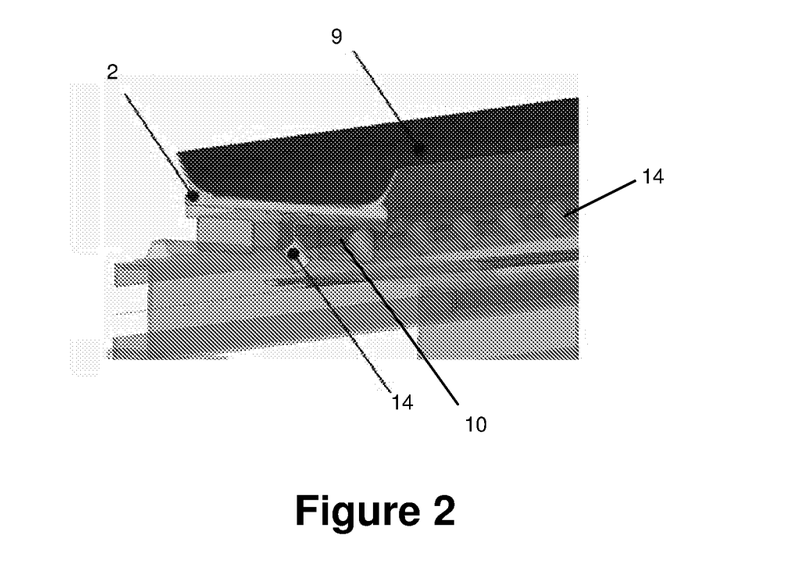
FIG. 2 is a partial perspective cross-sectional view of the HVBF of FIG. 1.

Referring to FIGS. 1 and 2, a typical horizontal vacuum bed filter (HVBF) 1 is shown, comprising an endless belt 2 mounted on a conveyor frame 3 with rollers 4. A feed system 5 comprises a feed hopper 6 mounted on a hopper frame 7. Slurry is fed through the hopper 6 and discharged by a distributor 8 onto a filter cloth 9 affixed to the belt 2, as best shown in FIG. 2. The belt 2 has recessed channels (not shown) that permit air flow or a vacuum suction force to be applied to the filter cloth 9. A vacuum chamber 10 is disposed beneath the belt 2 to enable vacuum suction force to be applied along the entire length of the filter cloth as it moves along the belt 2. The vacuum chamber 10 is fluidly connected to a vacuum pump (not shown), usually by way of a series of suction hoses 14 and separation tanks (not shown), that generates the vacuum suction force.

HVBFs offer a simpler technique to dewater materials, however are limited by particle size, as well as end moisture content. These machines offer lower installation costs, as well as significantly lower operating costs. Fine materials (<100 μm) often pose difficulties with HVBFs, as the material collapses on itself under the application of a vacuum. This closes the voids within the material, trapping some moisture within.

Figure 3:
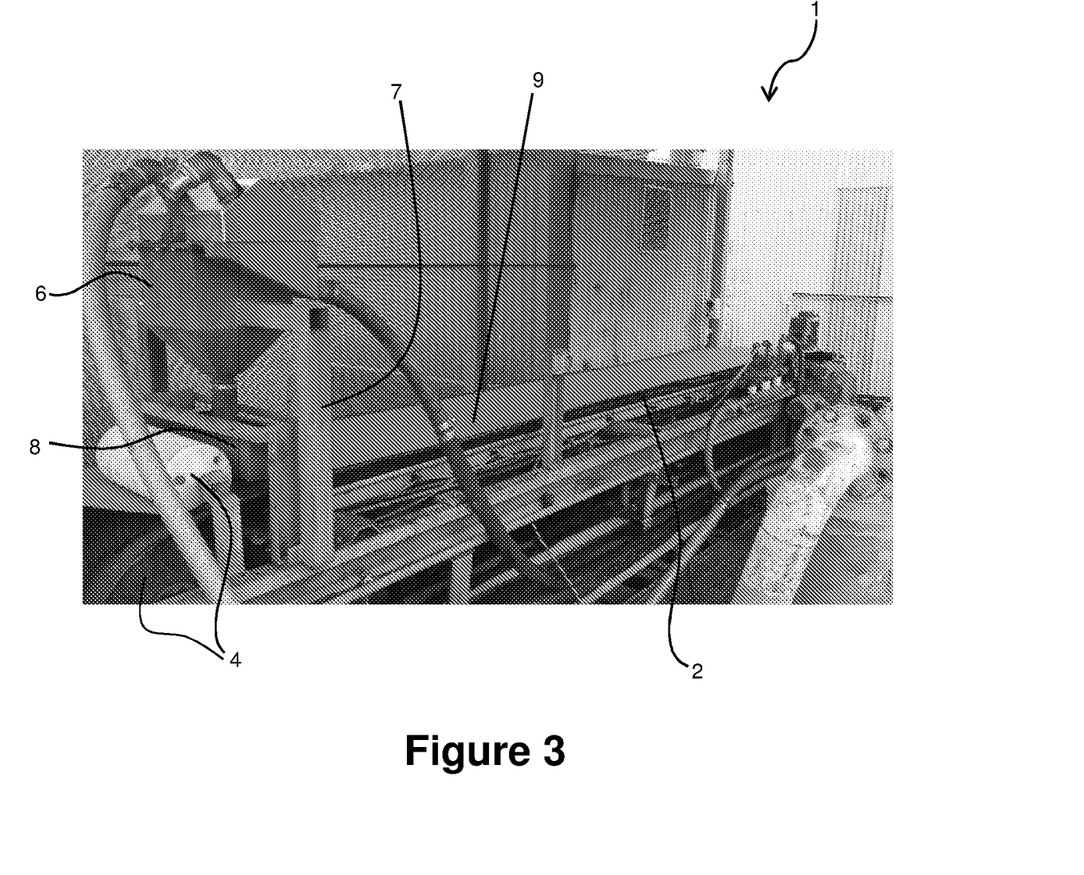
FIG. 3 is a perspective view of a belt conveyor for use with embodiments of the invention.

Referring to FIG. 3, a similar belt conveyor in the form of an HVBF 1 is used in conjunction with embodiments of the invention to dewater a material comprising fines, which typically cannot be dewatered satisfactorily using HVBFs.

Figure 4:
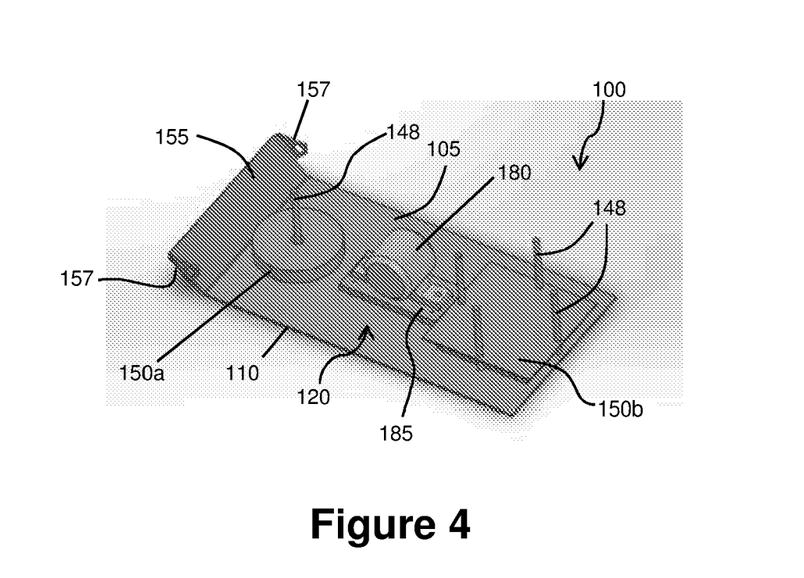
FIG. 4 is a perspective view of a vibration unit assembly according to one embodiment of the invention.
Figure 5:
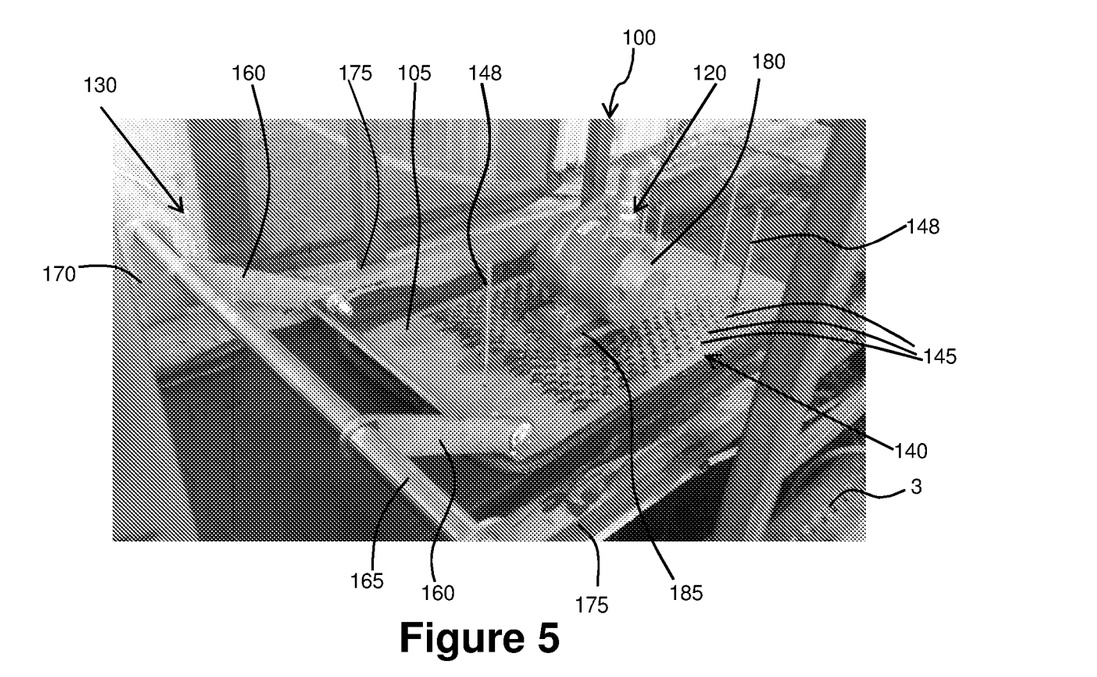
FIG. 5 is a perspective view of the belt conveyor of FIG. 3 with the vibration unit assembly of FIG. 4.

Referring to FIGS. 4 and 5, a vibration unit assembly 100 according to one embodiment of the invention is illustrated and is configured to act as a further dewatering unit or apparatus for the HVBF 1. The vibration unit assembly 100 comprises a vibration element 105 having a contact surface 110 and a vibration generator 120 operatively connected to the vibration element 105 for inducing vibrations in the vibration element. A connection assembly 130 is also provided for connecting the vibration element 105 to the belt conveyor 1. The contact surface 105 is engagable with the material transported on the belt conveyor 1 to vibrate and compress the material.

In this embodiment, the vibration element 105 comprises a plate and its contact surface comprises an underside 110 of the plate. The plate 105 has a portion 140 that has perforations 145 for permitting air to flow through the plate to further assist dewatering of the material. Also, posts 148 are arranged on the plate 105 to hold one or more weights 150a, 150b. The weights may be used to add further compressive force to the material as it passes underneath the plate 105. The plate 105 has an angled portion 155 with a pair of flanges 157 on either side for connecting the plate 105 to the connection assembly 130.

The connection assembly 130 comprises two connecting arms 160 pivotably connected to a mounting rod 165. The mounting rod 165 is connected to a pair of mounting flanges 170 that are in turn connected to either side 175 of the frame 3 of the HVBF 1. One end of each connecting arm 160 is pivotably connected to the flanges 157 of the plate 105.

The vibration generator 120 comprises a pneumatic vibrator 180 connected to a foot 185 for transmitting the vibrations from the pneumatic vibrator 180 to the plate 105. The pneumatic vibrator 180 was operated at a frequency of between 4,000 to 6,000 vibrations per minute (vpm), but may also operate at 500 to 50,000 revolutions per minute (rpm) or from 1 Hz to 1 kHz, depending on the air pressure driving it.

In operation, the now modified HVBF 1 operates to move the endless belt 2 as the slurry containing fine particles are delivered by the feed system 5 onto the filter cloth 9. The vacuum generated by the vacuum pump is applied to the filter cloth 9 via the vacuum chamber 10 and channels in the belt 2, to remove liquid from the slurry and begin the dewatering process.

Fine materials (<100 μm) often pose difficulties with HVBFs, as the material collapses on itself under the application of a vacuum. This closes the voids within the material, trapping some moisture within and preventing dewatering of this part of the material.

The pneumatic vibrator 180 is operated to induce vibrations in the plate 105 and these vibrations are then transmitted to the slurry beneath the underside 110. The effect of these vibrations is to realign the void structure of the material and fluidize the material. This releases the moisture trapped within and enables this allows excess moisture to be removed by the vacuum suction force, resulting in a drier filter cake. At the same time, the weight of the plate 105 applies a compressive force to the filter cake to compact the filter cake and reduce its volume. The inventors also believe that the compressive force could squeeze out additional fluid from the filter cake. The vibration and compression of the material as it is passes along the belt 2 thus enhances the dewatering performance of the HVBF.

Example 1

A magnetite (iron ore) sample was used in the embodiment of FIGS. 4 and 5 to determine the additional dewatering effect of the vibration unit assembly 100. The initial moisture content of the magnetite sample was measured as 20% water with 80% comprising magnetite fines having a particle size distribution of P80 at 35 to 40 microns (μm). It will be understood by one skilled in the art that P80 means that 80% of the particles pass through a nominated screen mesh size. For example, a P80 at 600 μm means that 80% of all particles present will pass through a 600 μm screen aperture. The filter cake thickness was 10 mm. A control test was performed using the HVBF of FIG. 3 without the vibration plate 105 and the resulting moisture content of the magnetite sample was reduced from 20% to 13.4%. When the embodiment of FIGS. 4 and 5 was operated with another magnetite sample having the same initial moisture content, the resultant moisture content of the filter cake was reduced to 9.4%. Hence, this demonstrated a significant reduction in the moisture that could be removed from material comprising fine particles.

Figure 6:
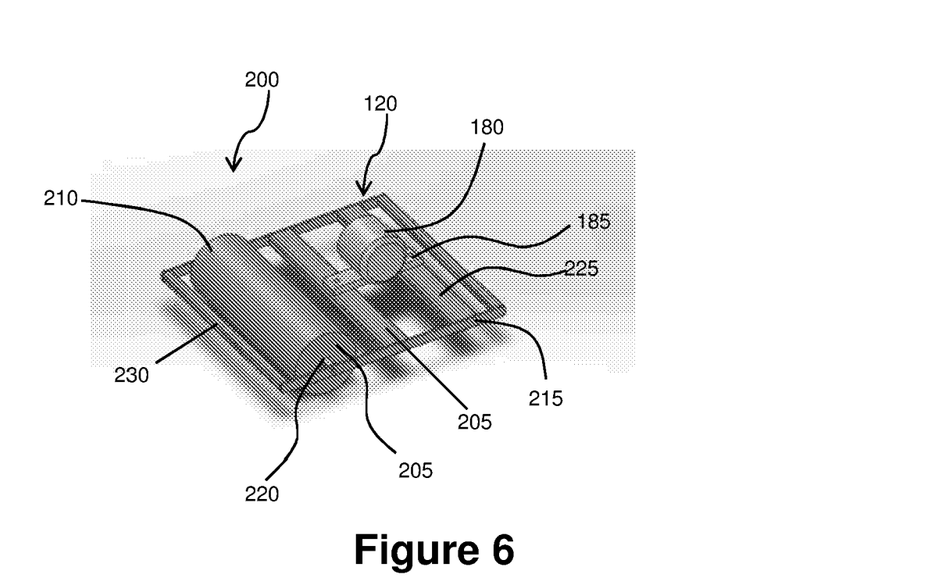
FIG. 6 is a perspective view of a vibration unit assembly according to another embodiment of the invention.
Figure 7:
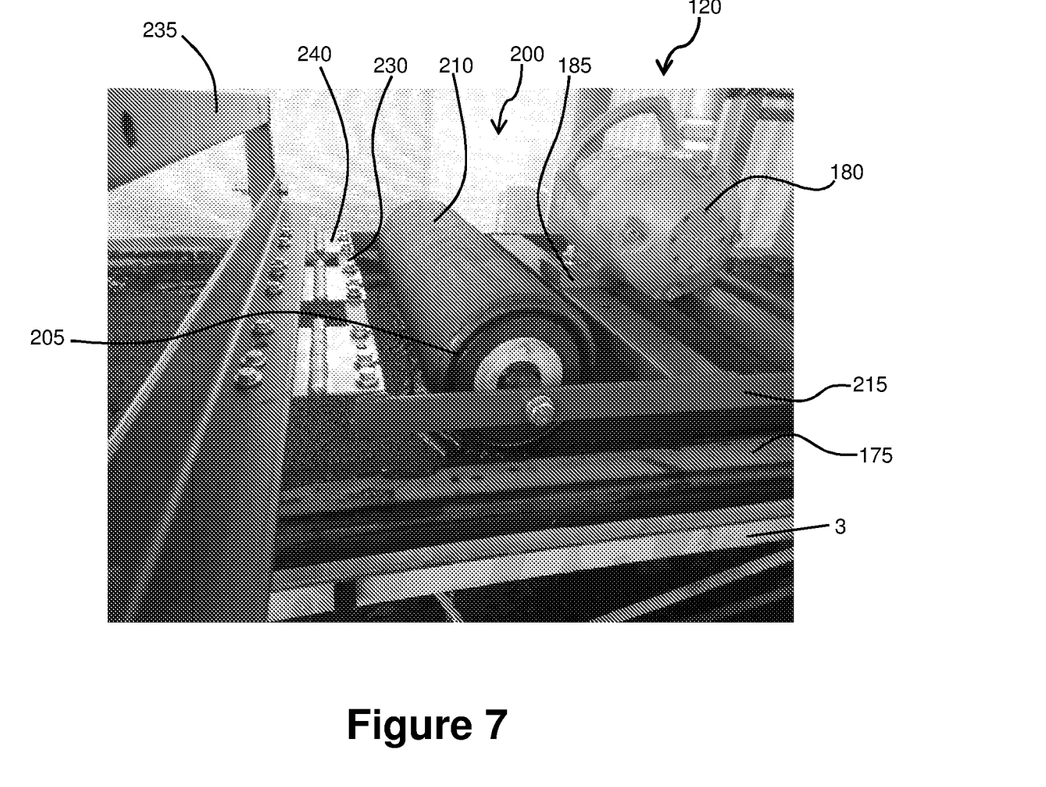
FIG. 7 is a perspective view of the belt conveyor of FIG. 3 with the vibration unit assembly of FIG. 5.

Referring to FIGS. 6 and 7, another embodiment of the invention is illustrated, where a vibration unit assembly 200 comprises a vibration element in the form of a cylindrical roller 205 with a contact surface in the form of its outer surface 210. The roller 205 is rotatably mounted to a frame 215 via an axle 220. The vibration generator 120 is mounted to the frame 215 by its foot 185 and supporting arms 225. As best shown in FIG. 7, the vibration unit assembly 200 is connected to the HVBF by one end 230 of the frame 215, which is hingedly connected to a mounting frame 235 of the HVBF 1 using several hinges 240. The hinged mounting of the vibration unity assembly 200 permits the roller 205 to follow any contours created where the material is uneven on the filter cloth.

This embodiment works in essentially same manner as the embodiment of FIGS. 4 and 5. As the material is deposited by the feed system 5 onto the filter cloth 9 and moved along by the belt 2, the vibration generator 120 induces vibrations through the roller 205 and to the material via the roller outer surface 210. The vibrating roller 205 on top of the material realigns the void structure within, fluidising the material and releasing any trapped liquid or moisture. In addition, as the roller 205 rolls on top of the material, it applies a compressive force, squeezing out moisture and liquid and further compacting the filter cake. This released liquid or moisture can be removed by the vacuum suction force generated by the vacuum chamber 10, hoses 14 and vacuum pump 12. The resultant filter cake is a much drier product.

The inventors believe that the roller 205 may be a more practical embodiment, since it is more easily scaled up to the size needed for full size HVBFs. The inventors also believe that the roller 205 much more wear resistant than the plate 105 because the roller 205 rolls along the material, rather than scraping along the surface of material, which may more readily wear out the underside 110 of the plate 105, especially where the material comprises sharp and hard iron ore particles. Consequently, the inventors expect that the roller 205 will have a longer service life than the plate 105.

Example 2

Figure 8:
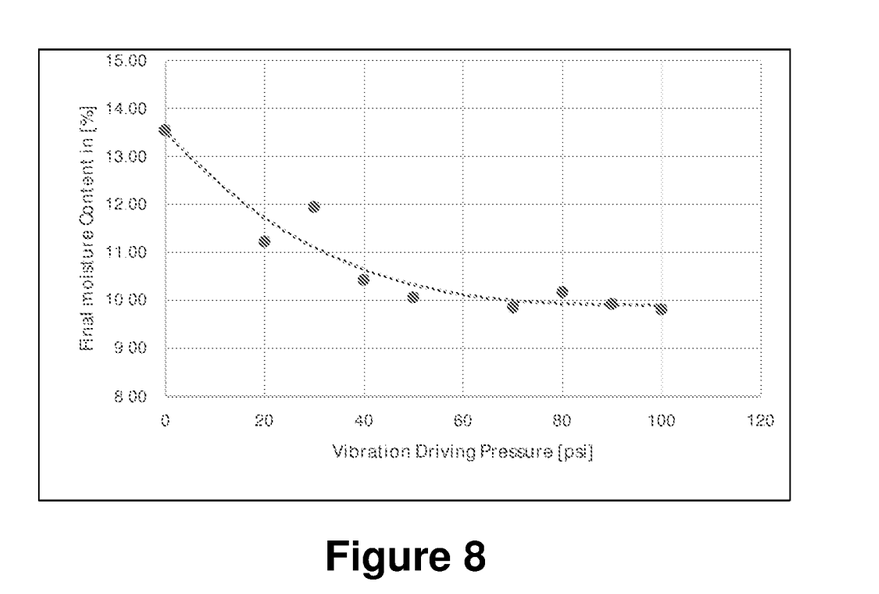
FIG. 8 is a graph showing the relationship between the final moisture content of a filter cake and the vibration pressure.

A duplicate magnetite sample (filter cake thickness 10 mm, 20% moisture content, 80% magnetite content) was used to test the vibration unit assembly 200 of FIGS. 6 and 7. The results of the overall dewatering performance and its dependence on the air pressure driving the vibration generator are shown in FIG. 8. It is clear from these results that the vibration unit assembly 200 achieved moisture contents of around 10% to 12%, compared to 14% for the control (i.e. no vibration). The results also show that there is a clear trend of increased dewatering performance with an increase in driving pressure. It also appears that there is a minimum moisture content at about 10%. An increase in driving pressure past 100 psi does not appear to result in a significant decrease in moisture content below this threshold. In this case, and as stated above, 0 Psi represents the control test and the compression achieved from the roller's bodyweight (equivalent to 38.4 kg) did not show any influence in the dewatering capability of the HVBF 1 alone. Optimal performance occurs in the range of 40 to 100 psi for driving pressure.

In other examples, the vibration unit assembly was on a fine iron ore sample and a gold tailings sample. During the tests, a moisture reduction of 4 to 5% was achieved for the iron ore, and a 5% moisture reduction was achieved for the gold tailings, when compared to standard operation of a HVBF. That is, compared to a standard HVBF that reduced the moisture content to around between 13% and 14%, the vibration unit assembly was able to reduce the moisture content to around between 9% and 10%.

In further embodiments, the vibration generator may be a rotating electrical vibrator, a linear electric vibrator or electromagnetic vibrator. In the case of a rotating electrical vibrator, it may operate at 500 to 50,000 rpm and/or at a driving pressure of up to 100 psi. Where a linear electric vibrator is used, it may operate from 1 Hz to 1 kHz while for an electromagnetic vibrator, it may operate at up to 10 kHz. However, the vibrator frequency and amplitude may vary depending on the type of material being processed, the filter cake thickness, belt speed and the amount of compressive force dictated by the size and/or weight of the vibration element.

While the embodiments of the invention have been described using vibration elements in the forms of a plate and a roller, it will be appreciated that the vibration element can take other forms. For example, the inventors believe that one alternate configuration is to replace the roller 205 with one or more balls, like beads on a rod, which would have substantially the same effect. Other examples may include tubes, rods and skid-like plates. Likewise, the shape of the vibration element may vary, and could take the form of a triangular wedge or have an oval or circular appearance, as desired.

In addition, the vibration unit assembly 100, 200 may comprise a plurality of vibration elements 105, 205, each connected to the same vibration generator 120 or their own individual vibration generators. Furthermore, the vibration elements (and their associated vibration generators, where the vibration elements are operatively connected to their own vibration generators) may be connected in series or in parallel. Alternatively, there may be a plurality of vibration unit assemblies 100, 200 provided along the length of the HVBF 1.

Figure 9:
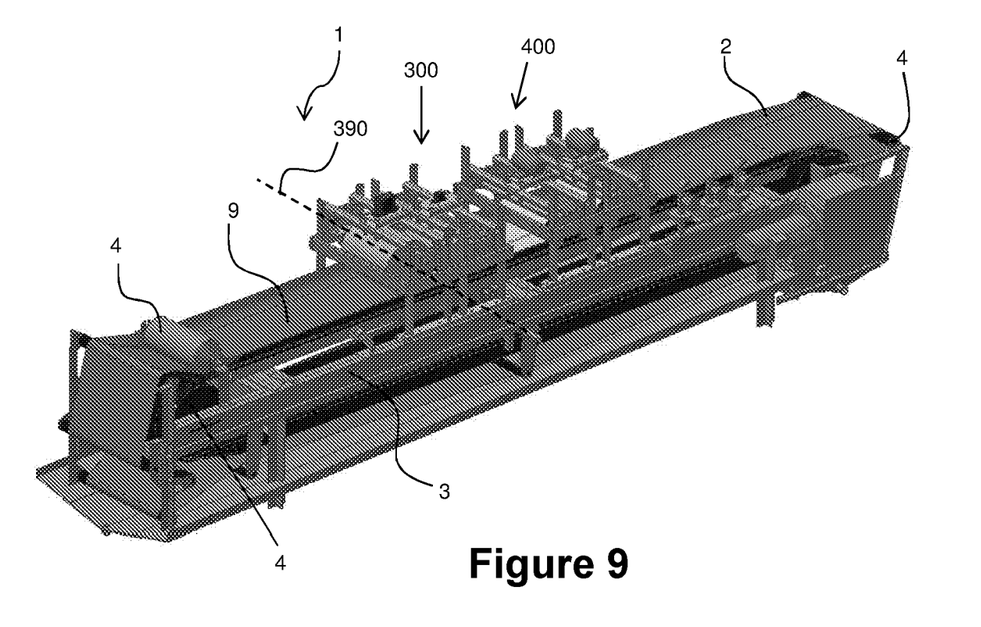
FIGS. 9 to 11 are perspectives view of a vibration unit assembly according to a further embodiment of the invention.
Figure 10:
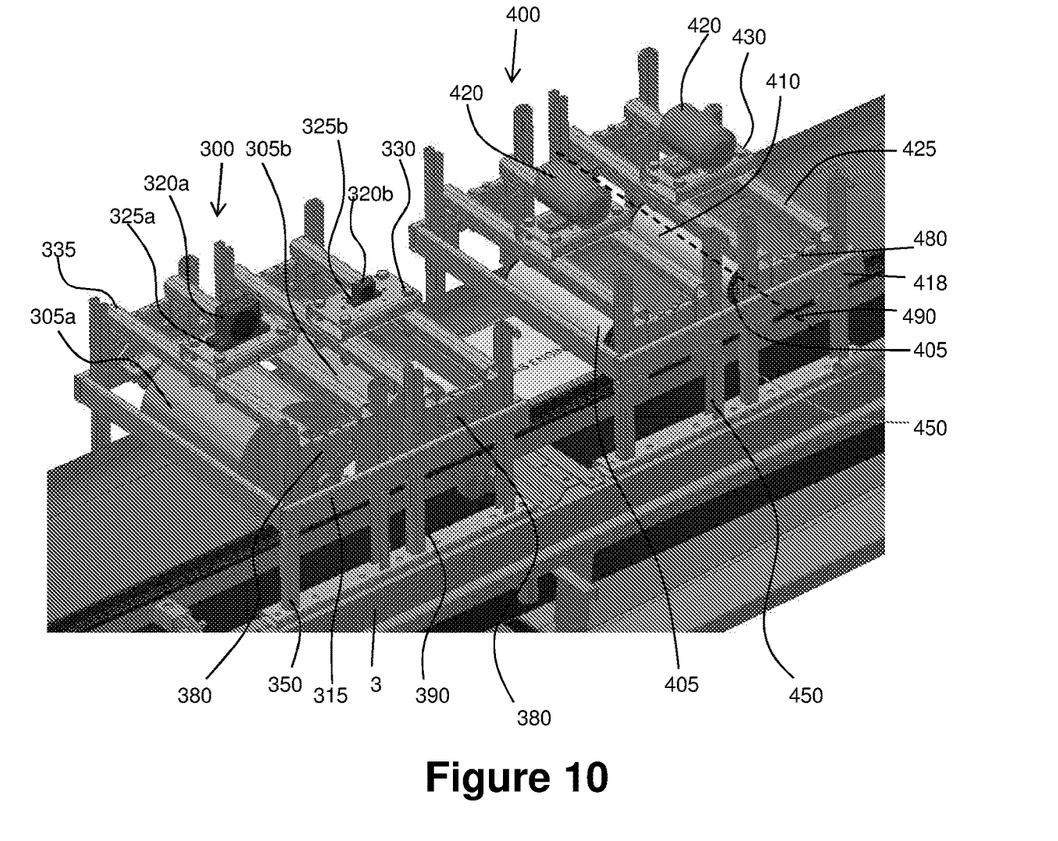
Figure 11:
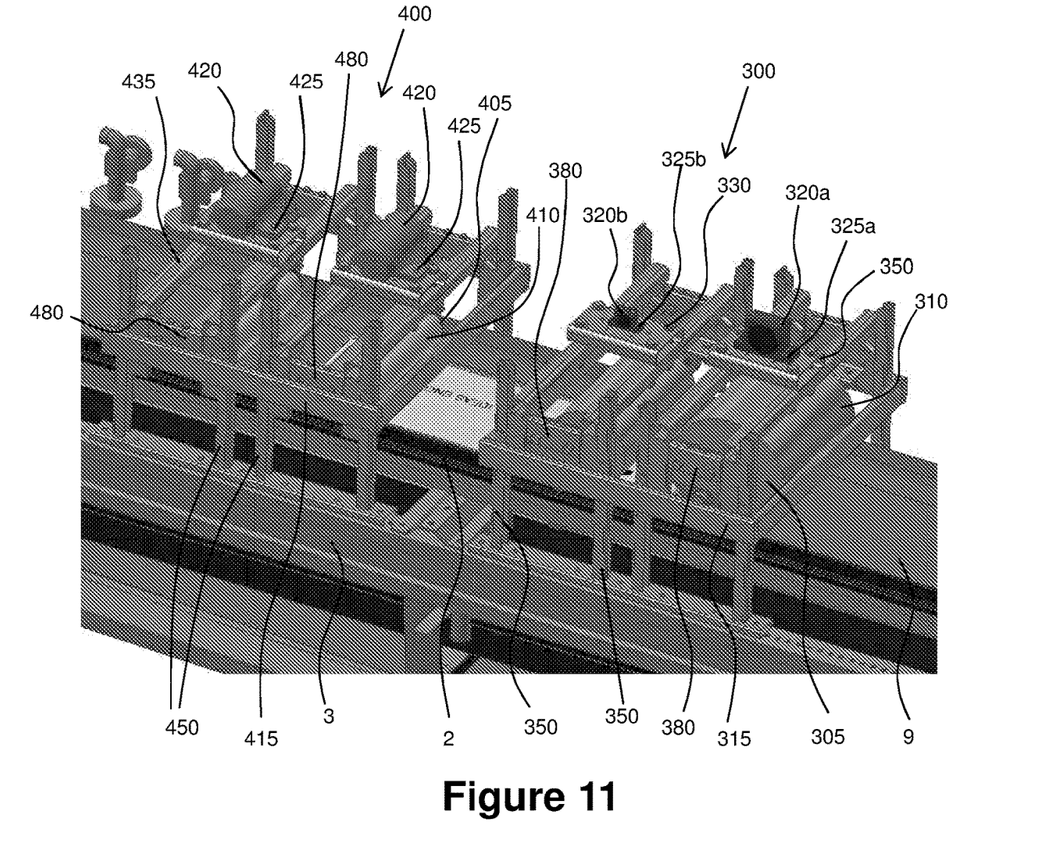

Referring to FIGS. 9 to 11, a further embodiment of the invention is illustrated, where two vibration unit assemblies 300, 400 are mounted to the conveyor 3 of a HVBF 1 (the feed system 5 has been omitted for clarity purposes). Each vibration unit assembly 300, 400 comprises two sets of vibration rollers (305, 405) with their own vibration generators (320, 120) connected in series. The vibration rollers 305 are of different sizes, the vibration roller 305a having a larger diameter than the vibration roller 305b. In addition, the vibration generators 320 are rotating electric vibrators and are also of different sizes, with the vibration generator 320a being larger than the vibration generator 320b to provide sufficient vibrations to the larger vibration roller 305a. The vibration generators 320 are mounted by their respective feet 325a, 325b on mounting plates 330 that are in turn mounted on supporting arms 335 connected to the mounting frame 315. Legs 350 connect and support the mounting frame 315 on the conveyor frame 3.

The vibration unit assembly 400 is arranged in a similar manner to the vibration unit assembly 300, having vibration rollers 405 and pneumatic vibrators 420. The pneumatic vibrators 420 are also mounted on their respective feet 425 to supporting arms 435 via mounting plates 430. The mounting frame 415 is connected to the supporting arms 435 and the legs 450, which connect and support the mounting frame 415 to the conveyor frame. However, the vibration rollers 405 and pneumatic vibrators 420 are of the same size.

Both vibration unit assemblies 300, 400 include positioning assemblies in the form of end plates 380, 480 that mount the vibration rollers 305a, 305b, 405 to the mounting frame 315, 415 via their respective axles (not shown). These end plates 380, 480 comprise U-shaped channels to receive the vibration roller axles and are slidably mounted to the mounting frame 315, 415 to permit the vibration rollers 305a, 305b, 405 to be positioned at an angle to the conveyor belt 2 and filter cloth 9, and thus at angle to the filter cake. The range of angular movement is preferably +/−45° from the longitudinal axis 390, 490 of the vibration roller 305a, 305b, 405, and is perpendicular to the length of the HVBF 1 (i.e. the direction of movement of the conveyor belt 2). This enables the vibration unit assemblies 300, 400 to accommodate variations in the depth of the filter cake on the conveyor belt 2. In some embodiments, the end plates 3809, 480 may permit lateral movement of the vibration roller 305a, 305b, 405 at an angle to the direction of movement of the conveyor belt 2 and the filter cake.

The use of a plurality of vibration unit assemblies 300, 400 improves the dewatering action of the HBVF 1 along its length. In addition, the use of a larger vibration roller 305a enables initial compression of larger mass in the untreated filter cake, which is then reduced in mass for treatment by the smaller diameter vibration rollers 305b, 405.

Also, the contact surfaces 110, 210 of the plate 105 and roller 205 are shown as being relatively smooth. However, in other embodiments, their respective contact surfaces 110, 210 may have different profiles, such as protrusions or nodules extending outwardly to provide additional engagement with the material and/or add more compressive force to the material. These protrusions may also have various shapes, such as hemispherical, square, rectangular, pyramidal, tooth-like (square or saw-tooth) or any other polyhedral shape. The contact surfaces in other embodiments may have an irregular profile without any discernible pattern and/or may include recesses.

In some embodiments, the vibration unity assembly 100, 200 also comprises a positioning assembly to adjust the position of the vibration element (plate 105, roller 205 or ball(s)) relative to the belt conveyor/HVBF 1. Generally, the positioning assembly is able to adjust the position of the vibration element at an angle relative to a planar surface of the belt conveyor (generally, the surface of the endless belt 2) in order to follow the contours of the material on the endless belt, similar to the end plates 380, 480 comprising the positioning assemblies of the vibration unit assemblies 300, 400. The angle may vary from 0° to 90°, and preferably from 1° to 45° relative to the horizontal plane corresponding to the endless belt 2. In a further embodiment, the positioning assembly comprises a guide sleeve for guiding the vibration element into position. In this case, the plate 105 or roller 205 is partly placed inside the guide sleeve to guide it into position. In yet another embodiment, the positioning assembly comprises one or more sliding frames for guiding the vibration element into position. In other embodiments, the positioning assembly forms part of the connection assembly 130.

In other embodiments, the connection assembly 130 may be partly or fully automated. For example, the connecting arms 160 may be driven by motor to bring the vibration unit assembly 100 into and out of its operative position.

Although the preferred embodiments have been described with reference to a specific application, being used as a dewatering unit for HVBFs, it will be appreciated by one skilled in the art that the invention may be used for other applications and/or in many other types of belt conveyors, where it is desired that the material be treated with vibration and compression. For example, the vibration unit assemblies 100, 200 may be used to homogenise bulk particulate material by breaking up the material through vibration and then compacting the material through compression.

In another application, the vibration unit assemblies 100, 200, 300, 400 may be used to enable a higher throughput of material to be processed by the belt conveyor compared to a conventional conveyor, rather than as a dewatering unit to reduce moisture content and obtain a lower final cake moisture limit. In relation to this application, as an example, a vibration unit assembly similar to assembly 200 but having two vibration rollers 205 was used to process gold tailings having a P80 of 200 microns with a target moisture content of 17% moisture to enable dry stacking. It was found that an increased throughput (filtration rate) of 1000 kg/m$^2$/hr was achieved, compared to a throughput of 660 kg/m$^2$/hr with a conventional HVBF. With a typical HVBF size of 158 m$^2$ filter area, using the vibration unit assembly at full scale would equate the throughput to 158 tonnes per hour, compared to 104 tonnes per hour for a conventional HVBF without the vibration unit assembly. Hence, there is a significant increase of approximately 150% throughput at the target moisture rate. Accordingly, the vibration unit assemblies 100, 200, 300, 400 have significant potential for retrofitting to existing installed HVBFs and similar machines to achieve a higher throughput whilst achieving the same final cake moisture content.

It will further be appreciated that any of the features in the preferred embodiments of the invention can be combined together and are not necessarily applied in isolation from each other. For example, the connecting arms 160 may be used to pivotably connect the roller 205 to the frame 3 of the HVBF 1 instead of the hinges 240 connecting the frame 215. Similar combinations of two or more features from the above described embodiments or preferred forms of the invention can be readily made by one skilled in the art.

It can thus be seen that the invention provides significant advantages over the prior art. In particular, in its application to HVBFs, the embodiments of the invention enable HVBFs to be used for particle sizes below 100 μm, whereas previously HVBFs were incapable of processing these particle sizes. This is achieved by using the vibration unit assemblies 100, 200, 300, 400 as dewatering units to further reduce moisture due to the restructuring (rupturing of internal voids) and liquefaction (fluidisation) of the material. Consequently, the use of more costly and batch-run filter press machines can be avoided for these particle sizes, reducing installation, operation and maintenance costs. Also, as the HVBF with the installed vibration unit assembly 100, 200, 300, 400 can be run continuously (as opposed to a batch basis), the process becomes more efficient.

This advantage of improved moisture reduction provided by the invention is also achieved for larger particle sizes and the use of vibration and compression results in a significant reduction in moisture content, when compared to standard operation of a vacuum belt filter. This results in several benefits to the downstream material processing and transport systems in that there are significant cost savings compared to other methods (like filter press machines), there is further containment of waste water on site, there is Increased efficiency during transport (since it is no longer required to transport as much water) and increased safety in shipping through a now lower risk of liquefaction. Furthermore, the invention can be readily retrofitted to many existing HBVF and other belt conveyors, as well as being capable of customization to fit individual needs. All these advantages of the invention result in a cheaper, more efficient solution to the treatment of materials, especially mineral dewatering systems. In all these respects, the invention represents a practical and commercially significant improvement over the prior art Although the invention has been described with reference to specific examples, it will be appreciated by those skilled in the art that the invention may be embodied in many other forms.

The invention claimed is:

1. A vibration unit assembly for a belt conveyor, comprising:
   a vibration element having a contact surface;
   a vibration generator operatively connected to the vibration element for inducing vibrations in the vibration element; and
   a connection assembly for connecting the vibration element to the belt conveyor so that the vibration element may move relative to the belt conveyor; and
   a positioning assembly to adjust the position of the vibration element relative to the belt conveyor,
   wherein the contact surface is engagable with a material transported on the belt conveyor to vibrate and compress the material.

2. The vibration unit assembly of claim 1, wherein the vibration element comprises a plate and the contact surface comprises an underside surface of the plate.

3. The vibration unit assembly of claim 2, wherein a portion of the plate comprises perforations.

4. The vibration unit assembly of claim 1, wherein the vibration element comprises a roller and the contact surface comprises an outer surface of the roller.

5. The vibration unit assembly of claim 4, wherein the roller is mounted to a frame connected to the connection assembly.

6. The vibration unit assembly of claim 1, wherein the contact surface comprises one or more protrusions for engaging the material.

7. The vibration unit assembly of claim 1, wherein the vibration element comprises one or more weights for increasing the compression force on the material.

8. The vibration unit assembly of claim 1, wherein the vibration generator comprises at least one of a group of devices, the group of devices comprising a pneumatic vibrator, a rotating electrical vibrator, a linear electric vibrator and an electromagnetic vibrator.

9. The vibration unit assembly of claim 1, wherein the connection assembly comprises one or more connecting arms for pivotably connecting the vibration element to the belt conveyor.

10. The vibration unit assembly of claim 1, wherein the connection assembly comprises a frame for pivotably connecting the vibration element to the belt conveyor.

11. The vibration unit assembly of claim 1, wherein the positioning assembly comprises one or more slidable guides connected to the vibration element.

12. The vibration unit assembly of claim 1, wherein there is a plurality of vibration elements and a plurality of vibration generators, each vibration generator being operatively connected to a vibration element.

13. A belt conveyor, comprising an endless belt for transporting a material and the vibration unit assembly of claim 1.

14. The belt conveyor of claim 13, further comprising a filter cloth for supporting a material on the endless belt and permitting fluid to pass through, a vacuum chamber disposed beneath the endless belt and a vacuum pump operatively connected to the vacuum chamber to provide a vacuum suction force to the chamber and the endless belt.

15. A method for treating a material comprising a mixture of solid and fluid using the conveyor belt of claim 13, the method comprising the steps of:
    moving the material along the endless belt of the belt conveyor;
    applying a vibration force to the material with the vibration unit assembly; and
    applying a compressive force with the vibration unit assembly to compact the material.

16. A method for drying a material comprising a mixture of solid and fluid using the belt conveyor of claim 13, the method comprising the steps of:
    moving the material along the endless belt of the belt conveyor;
    applying a vibration force with the vibration unit assembly to rupture the material to release fluid;
    removing the released fluid from the material; and
    applying a compressive force with the vibration unit assembly to compact the material.

17. The method of claim 16, further comprising filtering the material as it moves along the belt conveyor to remove excess fluid from the material and the removing step comprises applying a suction force to the material to remove the fluid.

18. The method of claim 15, wherein the vibration force applying step and the compressive force applying step are performed simultaneously.

19. The method of claim 16, wherein the vibration force applying step and the compressive force applying step are performed simultaneously.

20. The vibration unit assembly of claim 7, wherein the vibration element comprises a holder for holding the one or more weights.

21. A vibration unit assembly for a belt conveyor, comprising:
    a vibration element having a contact surface;
    a vibration generator operatively connected to the vibration element for inducing vibrations in the vibration element; and
    a connection assembly for connecting the vibration element to the belt conveyor so that the vibration element may move relative to the belt conveyor;
    wherein the contact surface is engagable with a material transported on the belt conveyor to vibrate and compress the material; and
    wherein the vibration element comprises one or more weights for increasing the compression force on the material.

* * * * *